United States Patent
Roelleke

(10) Patent No.: US 6,725,141 B2
(45) Date of Patent: Apr. 20, 2004

(54) METHOD OF TRIGGERING RESTRAINT MEANS IN A MOTOR VEHICLE

(75) Inventor: Michael Roelleke, Leonberg-Hoefingen (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 10/220,192
(22) PCT Filed: Nov. 22, 2001
(86) PCT No.: PCT/DE01/04408
§ 371 (c)(1),
(2), (4) Date: Nov. 13, 2002
(87) PCT Pub. No.: WO02/053419
PCT Pub. Date: Jul. 11, 2002

(65) Prior Publication Data
US 2003/0105569 A1 Jun. 5, 2003

(30) Foreign Application Priority Data
Dec. 28, 2000 (DE) .......................... 100 65 518

(51) Int. Cl.⁷ .............................................. G06F 17/00
(52) U.S. Cl. ....................................................... 701/45
(58) Field of Search ..................... 701/45, 46, 47; 180/271; 280/728.1, 730.1, 730.2, 731–736, 801.1, 802, 806–808

(56) References Cited

U.S. PATENT DOCUMENTS

| 5,790,404 | A | 8/1998 | Faye et al. |
| 5,835,007 | A | 11/1998 | Kosiak |
| 5,999,871 | A | * 12/1999 | Liu .............. 701/45 |
| 6,125,313 | A | 9/2000 | Watanabe et al. |
| 6,199,903 | B1 | 3/2001 | Brambilla et al. |
| 6,219,605 | B1 | 4/2001 | Bauer et al. |
| 6,305,709 | B1 | 10/2001 | Okada |
| 6,312,013 | B1 | * 11/2001 | Baur et al. .............. 280/735 |
| 6,519,519 | B1 | * 2/2003 | Stopczynski .............. 701/45 |

FOREIGN PATENT DOCUMENTS

| DE | 44 45 996 | 6/1996 |
| DE | 195 46 297 | 6/1997 |
| DE | 198 16 989 | 11/1999 |
| DE | 198 20 212 | 11/1999 |
| DE | 199 09 297 | 9/2000 |
| DE | 199 09 538 | 9/2000 |
| DE | 199 17 710 | 10/2000 |
| EP | 0 458 796 | 12/1991 |
| JP | 11-255060 | 9/1999 |
| WO | 90/09298 | 8/1990 |

OTHER PUBLICATIONS

McConnell (US 2003/0023360 A1) 701/45.*

* cited by examiner

Primary Examiner—Thu V. Nguyen
(74) Attorney, Agent, or Firm—Kenyon & Kenyon

(57) ABSTRACT

A method of triggering a restraint in a motor vehicle in the event of an impact and/or a collision with an object. The time characteristic of the acceleration is detected in the form of at least one acceleration signal. The time characteristic of a velocity is generated from the acceleration signal. A threshold value for the velocity is determined as a triggering criterion. The impact velocity and the instant of impact are established using the aid of a pre-crash sensor system before the impact. The impact situation is classified with reference to the impact velocity. Using the classification of the impact situation, a triggering time window determined, in which the time characteristic of the velocity is generated and, the threshold value for the velocity is established from the acceleration signal, the classification of the impact situation being taken into consideration.

18 Claims, 4 Drawing Sheets

METHOD OF TRIGGERING RESTRAINT MEANS IN A MOTOR VEHICLE

FIELD OF THE INVENTION

The present invention relates to a method of triggering restraint means in a motor vehicle in the event of an impact and/or a collision with an object. The method primarily relates to the triggering of non-reversible restraint means, such as pyrotechnic seatbelt tighteners and airbags. For this purpose, the time characteristic of the acceleration is detected in the form of at least one acceleration signal. The time characteristic of a velocity is then generated from the acceleration signal. A threshold value for the velocity is determined as a triggering criterion.

BACKGROUND INFORMATION

Conventionally, airbag control devices measure the acceleration in the passenger compartment in the event of an accident and, on the basis of this acceleration, determine when restraint means, such as seatbelt tighteners and airbags, must be triggered.

A method of triggering restraint means in a safety system for vehicle occupants is discussed in European Patent No. 0 458 796, in which an acceleration signal is detected with the aid of a suitable acceleration sensor. Through integration over time, possibly in combination with suitable weighting, this acceleration signal is converted into a velocity. A threshold value is used as a triggering criterion for the velocity. In the method of European Patent No. 0 458 796, the threshold value is determined as a function of one or more state variables or of prior state variables of the motor vehicle. For example, the acceleration signal itself, a signal derived therefrom, such as the velocity, or even the time passing during the crash may be considered as state variables.

The threshold value is selected in the context of the conventional method in such a manner that it ensures safe and reliable triggering of the necessary restraint means in all impact situations coming into consideration, independent of the type of collision partner and the impact velocity, i.e., the relative velocity between the motor vehicle and the collision partner. Dynamic adaptation of the threshold value to the specific impact situation is not possible here, since in this case, neither a suitable sensor system nor a corresponding signal analysis system is provided.

SUMMARY OF THE INVENTION

In accordance with an exemplary embodiment of the present invention, a method is provided in which the triggering of restraint means, such as airbags and seatbelt tighteners, is better adapted to the specific impact situation and unnecessary triggering of restraint means may be avoided.

This may be achieved according to an exemplary embodiment of the present invention in that the impact velocity and the instant of impact are established with the aid of a pre-crash sensor system before the impact. The impact situation is classified with reference to the impact velocity. A triggering time window, in which the time characteristic of the velocity is generated, is determined with the aid of the classification of the impact situation, and, in parallel to this, a threshold value for the velocity is established from the acceleration signal, the classification of the impact situation being taken into consideration.

According to an exemplary embodiment of the present invention, the conventional "single point sensing systems" may be expediently expandable by a pre-crash sensor system to be installed in the motor vehicle in order to detect possible collision partners in the surroundings of the vehicle beforehand. With the aid of the pre-crash sensor system, the impact velocity (closing velocity $v_{close}$) and the instant of impact ($t_0$), i.e., the time difference until the impact against the object, may be established. If the pre-crash sensor system includes at least two pre-crash sensors arranged in a suitable manner, the offset, i.e., the impact point and the impact angle, may additionally be determined using a triangulation method. In the context of the pre-crash sensing, radar measurements, infrared measurements, or even optical measurement methods may be used.

Furthermore, according to an exemplary embodiment of the present invention, the impact situations in consideration may expediently be classified with reference to the impact velocity, since the impact velocity alone may provide information about the severity of the crash. The optimum triggering time and the maximum necessary restraint means may be a function of further parameters, such as the type of impact, the mass ratio of the collision partners, and the ratio of the rigidities of the collision partners. Furthermore, the classification of the impact situation on the basis of the impact velocity according to an exemplary embodiment of the present invention may allow the localization to a triggering time window $[t_A \ldots t_B]$ of the triggering time which is to be established. This may provide the possibility of including information about the course of the crash after instant of impact $t_0$ until beginning $t_A$ of triggering time window $[t_A \ldots t_B]$ in the determination of the threshold value. In addition, the generation of the time characteristic of the velocity from the acceleration signal may now be restricted to the triggering time window.

Additionally, according to an exemplary embodiment of the present invention, it may be expedient to consider the specific impact situation while determining the threshold value from the acceleration signal, since, for example, higher impact velocities may require more sensitive triggering of the restraint means than lower impact velocities. Therefore, according to an exemplary embodiment of the present invention, the classification of the impact situation is also considered while establishing the threshold value.

In an exemplary method according to the present invention, the maximum necessary restraint means in an impact situation are also determined with the aid of the classification of the specific impact situation.

There are various possibilities for classifying the impact situations with reference to the impact velocity. In a variant for two-stage restraint means, velocity clusters in the form of velocity ranges for the impact velocity are formed, the cluster limits being selected according to the respective maximum necessary restraint means. In this case, the velocity clusters are defined as the velocity ranges in which, for all impact situations in consideration, either no restraint means are necessary (cluster C0)

or the first stage of the restraint means is necessary in the belted state for some of the impact situations in consideration, while restraint means are not yet necessary in the belted state (cluster C1), or the first stage of the restraint means is necessary in the belted state for some of the impact situations in consideration, while the second stage of the restraint means is not necessary in the unbelted state or in the belted state (cluster C2), or the first and second stages of the restraint means are necessary in the unbelted state for some of the impact situations in consideration, while the second stage of the restraint means is not necessary in the belted state (cluster C3), or the first and second stages of the restraint means are necessary both in the unbelted state and in the belted state for some of the impact situations in consideration (cluster C4).

In the context of the classification of a specific impact situation, the corresponding impact velocity is assigned to one of these velocity clusters. The maximum necessary restraint means may then be determined easily on the basis of the classification of the impact situation and/or the assignment to the corresponding velocity cluster.

The above-described classification of the impact situations may be advantageous because the triggering time window for a specific impact situation may be established easily with the aid of the velocity values which form the cluster limits of the velocity cluster assigned to the corresponding impact velocity.

In the context of an exemplary method according to the present invention, the time characteristic of a velocity is generated from the acceleration signal. There are also various possibilities in principle for this purpose. In an exemplary embodiment, the acceleration signal is integrated over time. The working signal resulting from this may then also be weighted using a suitable weighting function. However, the acceleration signal may also be weighted first in order to subsequently integrate the working signal resulting therefrom over time. It may also be possible to perform two weightings, namely a first weighting before the integration over time and a second weighting after the integration over time.

As mentioned above, according to an exemplary embodiment of the present invention, the classification of the impact situation is also taken into consideration in establishing the threshold value. In an exemplary method according to the present invention, the acceleration signal is filtered and/or transformed to establish the threshold value, the transformation being able to be performed before or after the filtering. In this case, it may be advantageous if at least some of the filter parameters and/or the transformation parameters are determined as a function of the respective classification of the impact situation, in order to take the specific impact situation into consideration.

In an exemplary method according to the present invention, the object, i.e., the collision partner, is classified with regard to its mass and its rigidity by analyzing the time characteristic of the acceleration after the instant of impact. This object classification may then also be taken into consideration in determining the threshold value, which additionally contributes to a more precise determination of the triggering time and the maximum necessary restraint means.

For object classification, on the one hand, the interaction of the motor vehicle with the object at the beginning of the impact may be analyzed as a function of the classification of the impact situation. In this connection, it may be advantageous to perform and analyze a short-time integration of the acceleration signal after the instant of impact in order to detect strong signal peaks at the beginning of the impact, and/or to analyze the signal rise after the instant of impact.

On the other hand, for object classification, fracture occurrences in the motor vehicle and changes in the barrier hardness in the course of the impact may be detected via high-frequency oscillations in the acceleration signal and analyzed as a function of the classification of the impact situation. The high-frequency oscillations in the acceleration signal may be detected easily with the aid of a high pass filter. The analysis may then be performed via peak values.

In an exemplary method according to the present invention, the acceleration signal is additionally analyzed even before the actual impact up to the instant of impact in order to recognize any pre-displacement of the vehicle occupants and/or an "out of position" situation before the impact and to take this into consideration when triggering the restraint means. Corresponding information may be obtained by integrating the acceleration signal twice and combined with further occupant parameters, such as the seat position, the steering wheel setting, and/or the occupant weight.

DETAILED DESCRIPTION

In the context of an exemplary method according to the present invention of triggering restraint means in a motor vehicle, even before a possible impact and/or a collision with an object, the instant of impact and the impact velocity, i.e., the relative velocity between motor vehicle and collision partner, are established with the aid of an appropriate pre-crash sensor system. The impact situation is then classified on the basis of the impact velocity determined in this manner. This classification of the impact situation is described in more detail in the following with reference to FIG. 1 for the case of two-stage restraint means.

Figure 1:
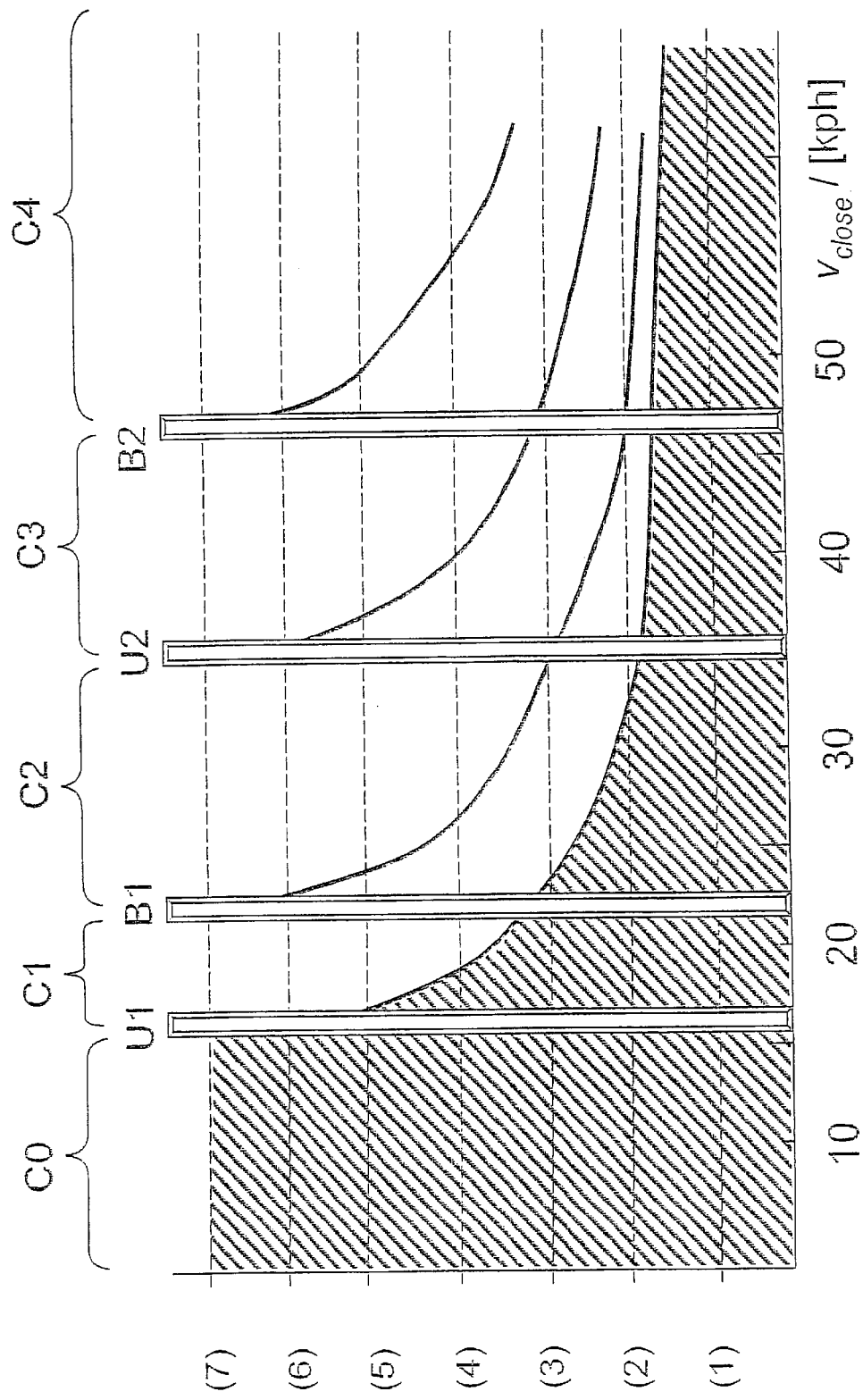
FIG. 1 shows a division of the value range of the impact velocity ($v_{close}$-axis) into velocity clusters (C0 to C4) using typical triggering requirements for a two-stage airbag for different types of crashes (y-axis).

The x-axis of the diagram illustrated in FIG. 1 represents the value range of possible impact velocities $v_{close}$. In the case illustrated here, the value range is divided into five different velocity ranges, which form velocity clusters C0 to C4. The cluster limits are selected here in such a manner that, with increasing impact velocity, a further restraint means and/or a further stage of the restraint means is added at each cluster limit as the maximum necessary restraint means. The y-axis of the diagram represents a scale of crash types whose severity increases from bottom to top. The following crash types are listed from bottom to top therein: (1) situations which may not require triggering (misuses), (2) side collision with another vehicle (car to car side), (3) driving underneath a truck trailer (truck underside), (4) collision with an oncoming vehicle during a passing maneuver with an overlap of 40% (offset crash deformable barrier), (5) collision with a tree or pole (pole), (6) impact on a rigid barrier at an angle of 30° (angular crash rigid barrier), and (7) frontal impact on a rigid barrier (rigid barrier 0°). Cluster C0 is defined as the velocity range in which no airbag triggering may be necessary for all impact situations listed in the y-axis of the diagram. This range is hatched. In the velocity range of cluster C1, the first stage of the restraint means may be necessary in the unbelted state for some of the impact situations in consideration, while restraint means may not yet be necessary in the belted state. This is indicated by curve U1, which separates the hatched region from the non-hatched region. In the velocity range of cluster C2, the first stage of the restraint means may be necessary in the belted state for some of the impact situations in consideration, while the second stage of the restraint means may not be necessary in the unbelted state or in the belted state, as is shown by curve B1. In the velocity range of cluster C3, the first and second stages of the restraint means may be necessary in the unbelted state for some of the impact situations in consideration, while the second stage of the restraint means may not be necessary in the belted state. This is illustrated by curve U2. Finally, in the velocity range of cluster C4, the first and second stages of the restraint means may be necessary both in the unbelted state and in the belted state for some of the impact situations in consideration, which is expressed by curve B2.

In the present case, the cluster limits illustrated in FIG. 1 as bars U1, B1, U2, and B2 therefore simultaneously define the maximum necessary restraint means for a correspondingly classified impact situation.

Figure 2:
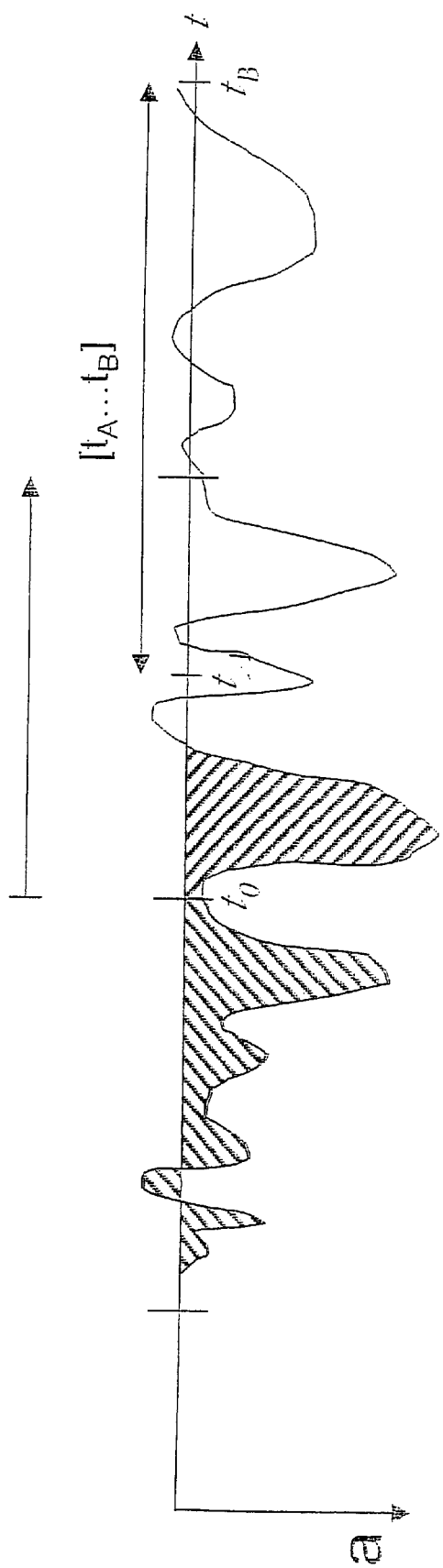
FIG. 2 shows the time characteristic of acceleration a in the case of a collision for pre-crash sensing.

The time characteristic of acceleration a in the case of a collision illustrated in FIG. 2 may be divided into two ranges by the information of the pre-crash sensor system used in the context of an exemplary method according to the present invention, namely the pre-braking range before the actual impact, i.e., before instant of impact $t_0$, and the crash characteristic from the moment of contact with the object, i.e., as of instant of impact $t_0$.

Since, in the context of an exemplary method according to the present invention, instant of impact $t_0$ and therefore also the time remaining until impact are determined, there is now the possibility of analyzing the acceleration data detected until instant of impact $t_0$ in order to make a statement about a possible pre-displacement and/or "out of position" situation of the vehicle occupants. Therefore, pre-braking situations, such as driving over a barrier or a braking maneuver directly before the actual crash, may now have their effects on the vehicle occupants detected. In this connection, the observation of a free mass in the motor vehicle in connection with the usable acceleration data of values of, for example, 3 g and above, has been shown to be sufficient, since accelerations of this magnitude prevent movement corrections by muscular force. The pre-displacement of the vehicle occupants to be expected before the actual crash may be evaluated easily by integrating twice an acceleration signal. This information may possibly be used in connection with further occupant information, such as the seat position, the steering wheel position, the occupant weight, etc., in order to, for example, determine the distance of an occupant from the steering wheel directly before the crash. The aggressiveness of the airbags may, for example, be altered as a function of the extent of the pre-displacement to be expected.

As described above, the actual crash characteristic begins as of instant of impact $t_0$. A triggering window $[t_A \ldots t_B]$ for the respective impact situation may be specified on the basis of impact velocity $v_{close}$ and the assignment of a specific velocity cluster based thereon. This triggering time window $[t_A \ldots t_B]$ determines the operating time range for generating the time characteristic of the velocity. For this purpose, the acceleration signal may, for example, be integrated once over time. The parameterization of functions, such as a filtering function and a transformation, which are used for determining the threshold value for the velocity on the basis of the acceleration signal, is also performed via the classification of the impact situation with reference to impact velocity $v_{close}$.

If instant of impact to is known and impact velocity $v_{close}$ and/or the corresponding velocity cluster is/are taken into consideration, a classification of the collision partner may additionally be performed by analyzing the time characteristic of the acceleration, which is explained in more detail below.

The signal characteristic directly after instant of impact $t_0$, the "first peak" of the acceleration signal, is particularly informative, since, for example, strong signal peaks occur even upon the first contact in the event of hard collision partners. These peaks may be detected via short-time integration of the acceleration signal. As a supplement or an alternative thereto, the first signal rise of the acceleration signal may also be detected. During the analysis of the "first peak", the interaction of the motor vehicle with the collision partner at the beginning of the crash is evaluated. The fracture occurrences in the motor vehicle and changes in the barrier hardness occurring as a consequence are indicated by high-frequency oscillations in the acceleration signal. Changes in the barrier hardness occur, for example, in vehicle-vehicle collisions, since very hard structures, such as longitudinal beams and the engine, are positioned behind the relatively soft front part in a motor vehicle. The high-frequency oscillations in the acceleration signal may be detected using a high pass filter and, for example, scanned via peak values.

Figure 3:
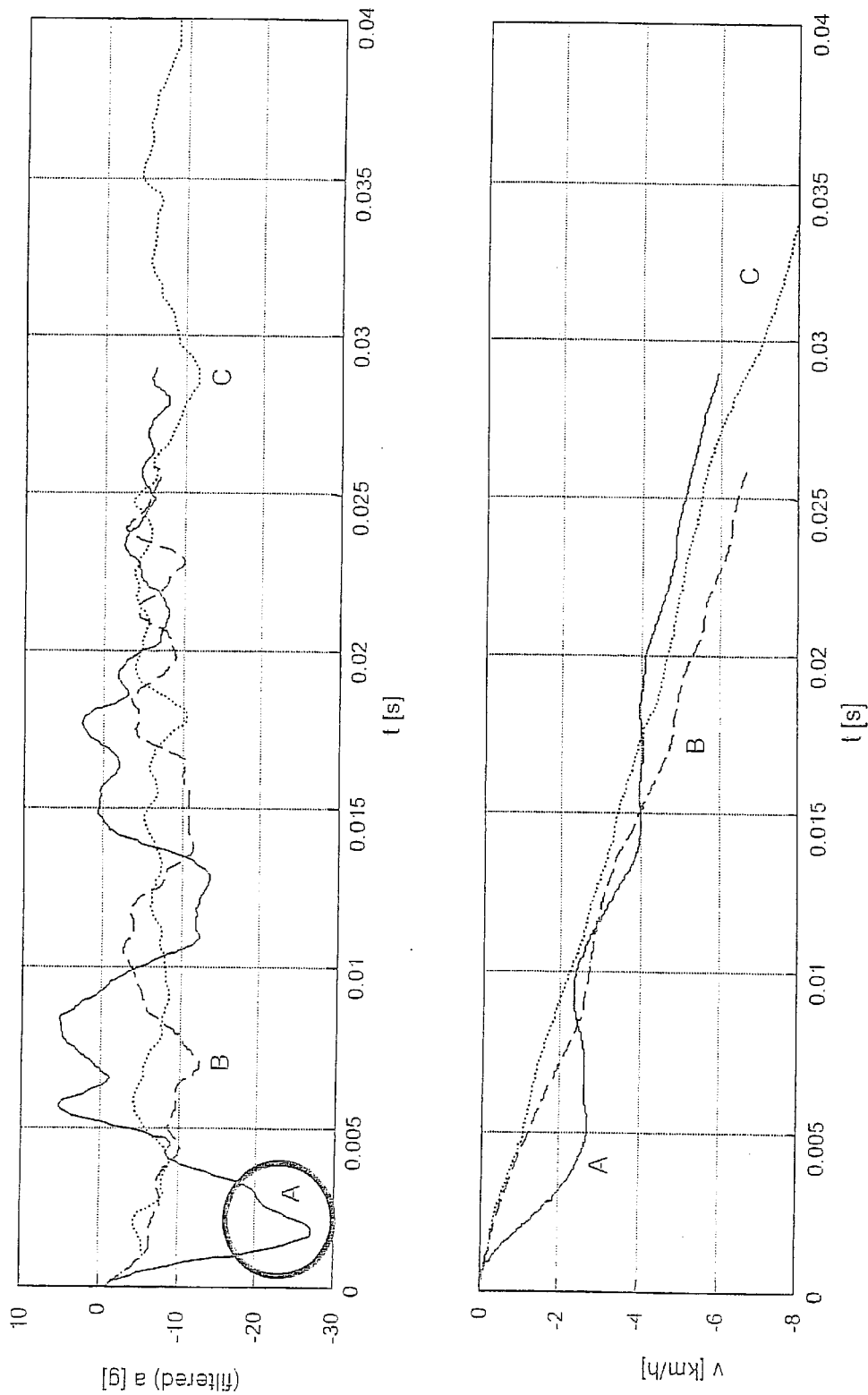
FIG. 3 shows the time characteristic of three acceleration signals and the velocity signals generated therefrom for the same impact velocity but different crash severities.

Three real acceleration signals A, B, and C are illustrated in the upper part of FIG. 3, which represent three crash characteristics with different collision partners but at the same impact velocity. Curve A illustrates a frontal collision at an angle of 30°. Curve B is a vehicle-vehicle collision at an angle of 90°, while curve C describes an impact of two vehicles at an angle of 75°. The velocity characteristics for A, B, and C derived therefrom are illustrated in the lower part of FIG. 4. The signals are illustrated up to the required triggering or, in the case of signal C, without a time limit. Acceleration signal A shows a very clear starting peak, although the corresponding velocity signal becomes rather weaker in the continuation of the characteristic. The three acceleration signals A, B, and C may be classified very clearly with regard to the corresponding collision partners using the functions described above.

As already explained, multiple pre-crash sensors may be used in the context of an exemplary method according to the present invention in order to obtain, in addition to instant of impact $t_0$ and impact velocity $v_{close}$, information about the object movement direction and the impact zone in the crash, i.e., the impact point and the impact angle. The block diagram of FIG. 4 relates to a variant of an exemplary method according to the present invention in which only one pre-crash sensor is used. A possible expansion to a second pre-crash sensor initially has no direct influence on the triggering algorithm. However, expanded crash clustering may be performed, in which the degree of overlap or degree of load on the individual longitudinal beams is taken into consideration.

Figure 4:
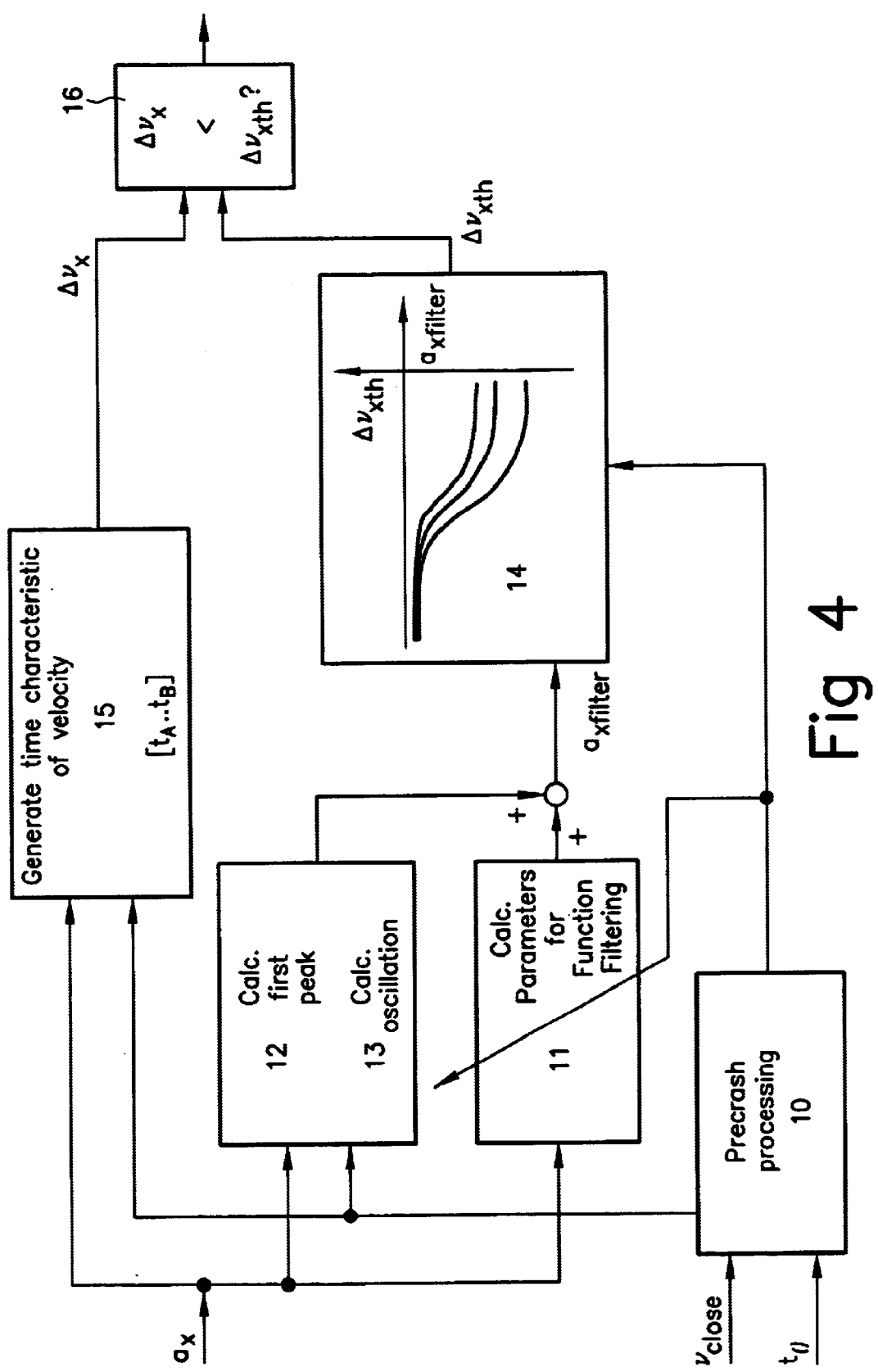
FIG. 4 shows the sequence of an exemplary method according to the present invention in the form of a block diagram.

In the case of the sequence of an exemplary method according to the present invention illustrated in FIG. 4, impact velocity $v_{close}$, established with the aid of the pre-crash sensor system, and time differential delta, up to the impact, i.e., up to instant of impact $t_0$, are digitized in an ASIC in the pre-crash sensor itself and transmitted in a suitable manner to a central control device, where pre-crash processing 10 occurs.

The processing of the acceleration signal in the context of pre-crash processing 10 occurs in two sections, as already explained in connection with FIGS. 2 and 3. During the pre-braking calculations, which are not illustrated in FIG. 4, the pre-displacement is calculated by integrating the acceleration signal twice, so that it may possibly be taken into consideration during triggering of the restraint means.

In addition, the impact situation, i.e., the crash characteristic, which begins with instant of impact $t_0$, is classified with reference to impact velocity $v_{close}$, in the context of pre-crash processing 10. For this purpose, impact velocity $v_{close}$, is assigned to a corresponding velocity cluster. A triggering time window $[t_A \ldots t_B]$, in which the triggering of the maximum necessary restraint means may occur, is determined on the basis of this classification. In addition, the parameters for the functions filtering 11, first peak 12, oscillation 13, and transformation 14 are calculated or, in the case of transformation 14, for example, retrieved in the form of corresponding characteristic curves.

At 15, the time characteristic of a velocity is generated from acceleration signal $a_x$, in that acceleration signal $a_x$ is integrated over time within established triggering time window $[t_A \ldots t_B]$. In parallel to this, the filtering of acceleration signal a is performed at 11, the establishing and evaluation of the "first peak" is performed at 12, and the evaluation of the oscillations in acceleration signal $a_x$, is performed at 13. Through the additional information which functions "first peak" 12 and "oscillations" 13 provide, the impact situation may be evaluated better than through a simple filtering 11. Therefore, the determination of threshold $\Delta V_{xth}$ for velocity $\Delta V_x$ is based on sum $a_{xfilter}$ of functions 11 to 13. Threshold value $\Delta V_{xth}$ is generated in the integral path via transformation 14. The direct comparison of threshold value $\Delta v_{xth}$ to integral $\Delta v_x$, calculated at 15 generates the triggering decision at 16.

Finally, it is to be noted once again that an exemplary method according to the present invention is intended to combine the information available from the acceleration signal and an additional pre-crash sensor system in such a manner that a triggering algorithm which may be as robust as possible and is less sensitive to misuse conditions, and may have high threshold values is available. At the same time, the pre-crash sensing allows improved adaptation of the triggering algorithm to the specific crash situation, in that the respective impact situation is taken into consideration during the determination of the threshold value for triggering the restraint means. With the aid of the pre-crash sensor system, protection against faulty triggerings in the event of minor accidents and misuse is also increased, since all driving maneuvers are detected and classified, so that the restraint means are actually only triggered in collisions with obstacles.

Therefore, with the aid of the pre-crash sensor system, in addition to the instant of impact and the impact velocity to be expected, the triggering time and the maximum necessary restraint means may be determined as a function of the crash severity, which is also a function of the mass ratio and the ratio of the rigidities of the two collision partners. These variables, which are unknown before the impact, may first be established in the crash characteristic from the acceleration data. For this purpose, the characteristic of the first collision peak is evaluated, which provides information about the rigidity ratios at the beginning of the crash. The severity of the oscillations in the acceleration signal until the latest possible triggering of the restraint means provides additional information about the hardness of the object. Thus, for example, slight signal oscillations indicate weak fracture of the vehicle structure, which indicates a soft barrier. In this manner, the collision partner may also be classified with regard to the mass ratio and the rigidity.

What is claimed is:

1. A method of triggering a restraint arrangement in a motor vehicle in the event of at least one of an impact and a collision with an object, comprising:
    detecting a first time characteristic of an acceleration in a form of at least one acceleration signal;
    generating a second time characteristic of a velocity from the at least one acceleration signal;
    determining a threshold value for the velocity as a triggering criterion;
    establishing an impact velocity and an instant of the impact assisted by a pre-crash sensor system before the impact;
    classifying an impact situation with reference to the impact velocity;
    determining a triggering time window in which the second time characteristic of the velocity is generated assisted by a classification of the impact situation; and
    establishing the threshold value for the velocity from the at least one acceleration signal using the classification of the impact situation;
    wherein the establishing the threshold value is performed in parallel to the determining the triggering time window.

2. The method as recited in claim 1, further comprising:
    determining a maximum necessary restraint arrangement assisted by the classification of the impact situation.

3. The method as recited in claim 1, wherein:
    the restraint arrangement includes a two-stage restraint arrangement;
    the classifying of the impact situation includes assigning to a velocity cluster the impact velocity, the velocity cluster being a velocity range which for all of a plurality of impact situations corresponds to one of:
    a first velocity cluster in which the two-stage restraint arrangement is not necessary,
    a second velocity cluster in which a first stage of the two-stage restraint arrangement is necessary in an unbelted state, and in which the two-stage restraint arrangement is not necessary in a belted state,
    a third velocity cluster in which the first stage of the two-stage restraint arrangement is necessary in the belted state, and in which a second stage of the two-stage restraint arrangement is not necessary in the unbelted state or in the belted state,
    a fourth velocity cluster in which the first and second stages of the two-stage restraint arrangement are necessary in the unbelted state, and in which the second stage of the two-stage restraint arrangement is not necessary in the belted state,
    a fifth velocity cluster in which the first stage and the second stage of the two-stage restraint arrangement are necessary both in the unbelted state and in the belted state.

4. The method as recited in claim 3, wherein the triggering time window for a specific impact situation is established with an aid of a plurality of velocity values, the plurality of velocity values forming a plurality of cluster limits of the velocity cluster determined for the specific impact situation during the classification.

5. The method as recited in claim 1, further comprising:
    integrating the at least one acceleration signal to generate the second time characteristic of the velocity.

6. The method as recited in claim 5, further comprising weighting the at least one acceleration signal to generate the second time characteristic of the velocity.

7. The method as recited in claim 1, further comprising:
filtering the at least one acceleration signal to establish the threshold value; and
determining at least some of a plurality of filter parameters as a function of the classification of the impact situation.

8. The method as recited in claim 1, further comprising:
transforming the at least one acceleration signal to establish the threshold value; and
determining at least some of a plurality of transformation parameters as a function of the classification of the impact situation.

9. The method as recited in claim 1, further comprising:
classifying the object with regard to a mass of the object and a rigidity of the object by analyzing the at least one acceleration signal after the instant of the impact; and
considering the classifying of the object in the determining of the threshold value.

10. The method as recited in claim 9, further comprising:
analyzing an interaction of the motor vehicle with the object at a beginning of the impact as a function of the classifying of the impact situation.

11. The method as recited in claim 10, further comprising:
performing and analyzing a short-time integration of the at least one acceleration signal after the instant of the impact in order to detect a plurality of strong signal peaks at the beginning of the impact.

12. The method as recited in claim 9, further comprising:
evaluating a signal rise after the instant of the impact.

13. The method as recited in claim 9, further comprising:
detecting a plurality of fracture occurrences in the motor vehicle and a plurality of changes in a barrier hardness in a course of the impact via a plurality of high-frequency oscillations in the at least one acceleration signal; and
analyzing the plurality of fracture occurrences and the plurality of changes in the barrier hardness a function of the classification of the impact situation.

14. The method as recited in claim 13, wherein:
the high-frequency oscillations in the at least one acceleration signal are detected using a high pass filter; and
the analyzing of the plurality of fracture occurrences and the plurality of changes in the barrier hardness is performed via a plurality of peak values.

15. The method as recited in claim 1, further comprising:
analyzing the at least one acceleration signal up to the instant of the impact in order to recognize any pre-displacement of at least one vehicle occupant before the impact; and
considering any pre-displacement of the at least one vehicle occupant when triggering the restraint arrangement.

16. The method as recited in claim 15, further comprising:
integrating twice the at least one acceleration signal to recognize any pre-displacement; and
combining information obtained by integrating with at least one further occupant parameter.

17. The method as recited in claim 15, wherein the at least one further occupant parameter includes at least one of a seat position, a steering wheel setting, and an occupant weight.

18. A control device for carrying out a method for triggering a restraint arrangement in a motor vehicle in an event of at least one of an impact and a collision with an object, comprising:
a first arrangement configured to detect a first time characteristic of an acceleration in a form of at least one acceleration signal;
a second arrangement configured to generate a second time characteristic of a velocity from the at least one acceleration signal;
a third arrangement configured to determine a threshold value for the velocity as a triggering criterion;
a fourth arrangement configured to establish an impact velocity and an instant of the impact assisted by a pre-crash sensor system before the impact;
a fifth arrangement configured to classify an impact situation with reference to the impact velocity;
a sixth arrangement configured to determine a triggering time window in which the second time characteristic of the velocity is generated assisted by a classification of the impact situation; and
a seventh arrangement configured to establish the threshold value for the velocity from the at least one acceleration signal using the classification of the impact situation;
wherein the seventh arrangement and the sixth arrangement operate in parallel.

* * * * *